United States Patent
Shoyama

(10) Patent No.: US 10,759,234 B2
(45) Date of Patent: Sep. 1, 2020

(54) AIRCRAFT TIRE MANAGEMENT METHOD AND AIRCRAFT TIRE MANAGEMENT DEVICE

(71) Applicant: BRIDGESTONE CORPORATION, Tokyo (JP)

(72) Inventor: Yoshinobu Shoyama, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 25 days.

(21) Appl. No.: 16/094,550
(22) PCT Filed: Apr. 17, 2017
(86) PCT No.: PCT/JP2017/015415
§ 371 (c)(1),
(2) Date: Oct. 18, 2018
(87) PCT Pub. No.: WO2017/183596
PCT Pub. Date: Oct. 26, 2017

(65) Prior Publication Data
US 2019/0118587 A1 Apr. 25, 2019

(30) Foreign Application Priority Data
Apr. 19, 2016 (JP) .................. 2016-083811

(51) Int. Cl.
B60C 23/00 (2006.01)
B60C 23/04 (2006.01)
(Continued)

(52) U.S. Cl.
CPC .............. *B60C 23/04* (2013.01); *B60C 19/00* (2013.01); *B60C 23/00* (2013.01); *B60C 23/001* (2013.01);
(Continued)

(58) Field of Classification Search
CPC ......... B60C 23/04; B60C 23/10; B60C 23/00; B60C 23/001; B60C 23/20; B60C 19/00; B60C 2200/02; B64C 25/36; B60S 5/04
See application file for complete search history.

(56) References Cited

U.S. PATENT DOCUMENTS

| 4,550,385 A | 10/1985 | Pulk et al. |
| 2008/0055060 A1 | 3/2008 | Logan |

(Continued)

FOREIGN PATENT DOCUMENTS

| DE | 10 2015 110 042 A1 | 12/2015 |
| EP | 2 930 037 A1 | 10/2015 |

(Continued)

OTHER PUBLICATIONS

International Search Report for PCT/JP2017/015415 dated Jun. 6, 2017 [PCT/ISA/210].
(Continued)

*Primary Examiner* — Craig M Schneider
*Assistant Examiner* — Jason K Niesz
(74) *Attorney, Agent, or Firm* — Sughrue Mion, PLLC

(57) ABSTRACT

In order to adjust the tire internal pressure on landing to an appropriate internal pressure, the internal pressure and temperature of the tires when housed inside the aircraft in flight, the temperature and atmospheric pressure around the aircraft, and the altitudes and air temperatures at the takeoff and landing sites of the aircraft are obtained, and a target internal pressure at takeoff is calculated from information relating to the altitude and air temperature at the takeoff airport, after which an in-flight tire internal pressure whereby the tire internal pressure becomes a target internal pressure on landing is calculated from the temperature and atmospheric pressure around the tires of the aircraft, the air temperature and atmospheric pressure at the landing airport, and information relating to a load anticipated to act on the tires on landing, and subsequently the in-flight tire internal pressure is adjusted so that the obtained internal pressure of the tires housed inside the aircraft becomes the calculated in-flight tire internal pressure.

1 Claim, 2 Drawing Sheets

(51) Int. Cl.
  *B60C 19/00*   (2006.01)
  *B60C 23/20*   (2006.01)
  *B60S 5/04*    (2006.01)
  *B64C 25/36*   (2006.01)
  *B60C 23/10*   (2006.01)

(52) U.S. Cl.
  CPC .............. *B60C 23/10* (2013.01); *B60C 23/20* (2013.01); *B60S 5/04* (2013.01); *B64C 25/36* (2013.01); *B60C 2200/02* (2013.01)

(56) References Cited

U.S. PATENT DOCUMENTS

| | | | |
|---|---|---|---|
| 2013/0015290 A1 | 1/2013 | Benmoussa et al. | |
| 2014/0027571 A1 | 1/2014 | Barmichev et al. | |
| 2015/0224831 A1 | 8/2015 | Miller | |
| 2018/0162182 A1* | 6/2018 | Coombs | F02M 35/10229 |

FOREIGN PATENT DOCUMENTS

| | | |
|---|---|---|
| JP | 02046401 B2 | 10/1990 |
| JP | 4-189610 A | 7/1992 |
| JP | 2008049999 A | 3/2008 |
| JP | 2013-18483 A | 1/2013 |
| JP | 2015-526338 A | 9/2015 |
| WO | 2015/143451 A1 | 9/2015 |

OTHER PUBLICATIONS

Supplementary European Search Report dated Jan. 21, 2019 issued by the European Patent Office in counterpart application No. 17 78 5934.

International Preliminary Report on Patentability with English translation of the Written Opinion of PCT/JP2017/015415 dated Oct. 23, 2018.

* cited by examiner

AIRCRAFT TIRE MANAGEMENT METHOD AND AIRCRAFT TIRE MANAGEMENT DEVICE

CROSS REFERENCE TO RELATED APPLICATIONS

This application is a National Stage of International Application No. PCT/JP2017/015415, filed on Apr. 17, 2017, which claims priority from Japanese Patent Application No. 2016-083811, filed on Apr. 19, 2016.

BACKGROUND OF THE INVENTION

1. Field of the Invention

The present invention relates to an aircraft tire management method and its device, and particularly to the adjustment of a tire internal pressure as an aircraft is landing.

2. Description of the Related Art

Conventionally, the internal pressure of the aircraft tires is checked before the tires are mounted on the aircraft body or before takeoff and adjusted to an internal pressure considering a load to be applied when taking off.

On the other hand, as a system monitoring an aircraft tire condition, there is proposed an aircraft tire monitoring device in which an RF response unit having sensors for detecting a tire pressure and temperature is provided within a tire, and data about the tire internal pressure and temperature is read by a reader attached to an airframe via an antenna from the response unit (see for example Patent Document 1).

Accordingly, states of operating tires can be monitored, and if necessary, appropriate measures can be taken to make maintenance or repair of a tire.

PRIOR ART DOCUMENT

Patent Document

Patent Document 1: Japanese Unexamined Patent Application No. 2008-49999

SUMMARY OF THE INVENTION

Problem to be Solved by the Invention

Incidentally, the internal pressure of the aircraft tire is adjusted to an appropriate internal pressure when taking off, but the internal pressure is not necessarily appropriate when landing, and it is necessary to adjust the tire internal pressure to the appropriate internal pressure when landing.

But, the Patent Document 1 simply detects the tire internal pressure and temperature but does not disclose or suggest necessity of adjusting the tire internal pressure to the appropriate internal pressure when the aircraft makes landing.

The present invention is made in consideration of the conventional problems and aims to provide an aircraft tire management method capable of adjusting a tire internal pressure on landing to an appropriate internal pressure and its device.

Means for Solving the Problem

The present invention is an aircraft tire management method comprising the steps of obtaining the internal pressure and temperature of tires housed inside an aircraft in flight; obtaining the temperature and atmospheric pressure around the aircraft; obtaining the altitudes and air temperatures at the takeoff and landing sites for the aircraft; calculating a target internal pressure at takeoff from information about the altitude and air temperature at a takeoff airport; calculating a tire internal pressure of the in-flight aircraft whereby the tire internal pressure becomes a target tire internal pressure on landing from information about the temperature and atmospheric pressure around the tires of the aircraft, the air temperature and atmospheric pressure at the landing airport, and a load anticipated to act on the tires on landing; and adjusting the tire internal pressure of the in-flight aircraft so that the obtained internal pressures of the tires housed inside the aircraft become the calculated tire internal pressure of the in-flight aircraft.

Thus, the tire internal pressure is adjusted in flight so that the tire internal pressure at landing becomes a target tire internal pressure. Thus, the tire internal pressure can be adjusted to a value so that deflection of tires becomes appropriate not only at liftoff but also at landing. Therefore, the abrasion resistance of the tires can be improved without losing the durability of the tires.

The present invention also relates to a device for managing an aircraft tire, comprising a tire information acquisition means for obtaining internal pressure information and temperature information of tires housed inside the aircraft in flight; an airframe information acquisition means for obtaining information about the temperature and atmospheric pressure around the aircraft; a landing tire internal pressure setting means for setting landing tire internal pressures, which are target internal pressures of the tires on landing, according to the altitude and air temperature at a landing site; an in-flight internal pressure calculation means for calculating an in-flight tire internal pressure according to the in-flight tire internal pressure and temperature information, and information about the temperature and atmospheric pressure around the tires of the aircraft; and a tire internal pressure adjusting means for adjusting pre-landing tire internal pressures so that the calculated pre-landing tire internal pressures become the landing tire internal pressures.

With the above configuration, an aircraft tire management device capable of improving the abrasion resistance of the tires can be realized without deteriorating the durability of the tires.

The aforementioned summary of the invention does not cover the entire necessary features of the invention but a subcombination of groups of features could also be an invention.

BEST MODE FOR CARRYING OUT THE INVENTION

Embodiments

Figure 1:
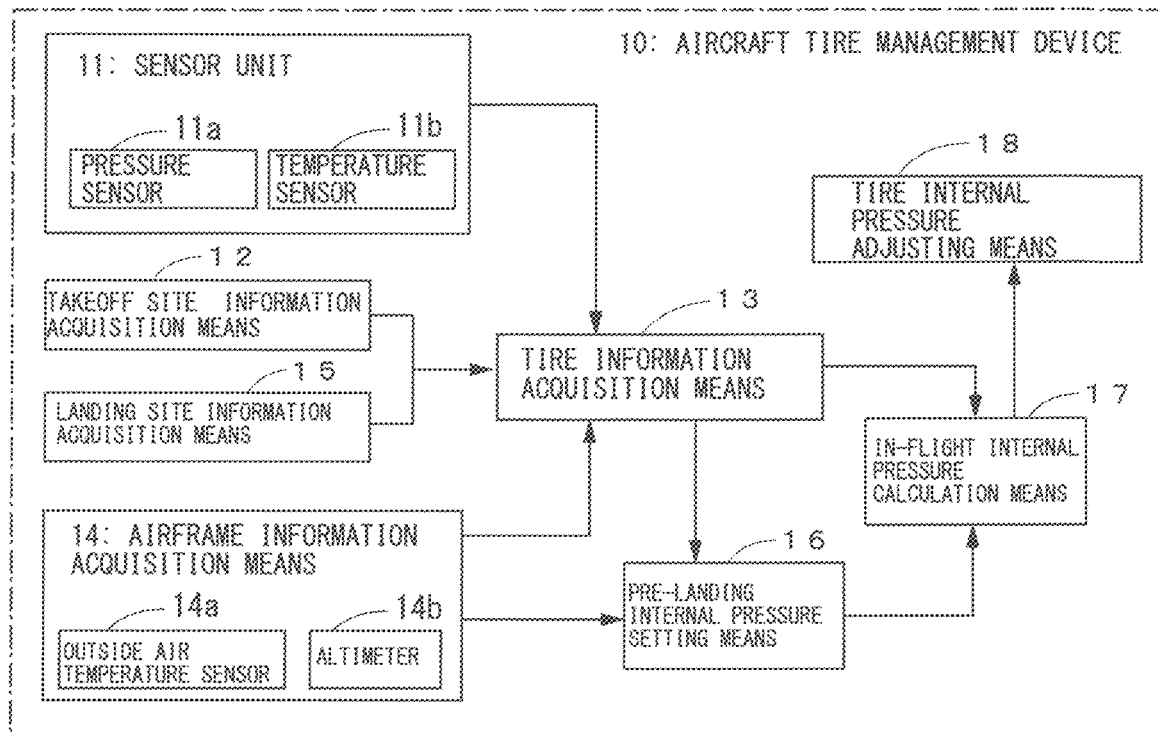
FIG. 1 is a diagram showing a configuration of an aircraft tire management device according to an embodiment of the invention.

FIG. 1 is a functional block diagram showing a structure of an aircraft tire management device 10 according to the present embodiment. In the figure, reference numeral 11 denotes a sensor unit, 12 denotes a takeoff site information acquisition means, 13 denotes a tire information acquisition means, 14 denotes an airframe information acquisition means, 15 denotes a landing site information acquisition means, 16 denotes a pre-landing internal pressure setting means, 17 denotes an in-flight internal pressure calculation means, and 18 denotes a tire internal pressure adjusting means.

Figure 2:
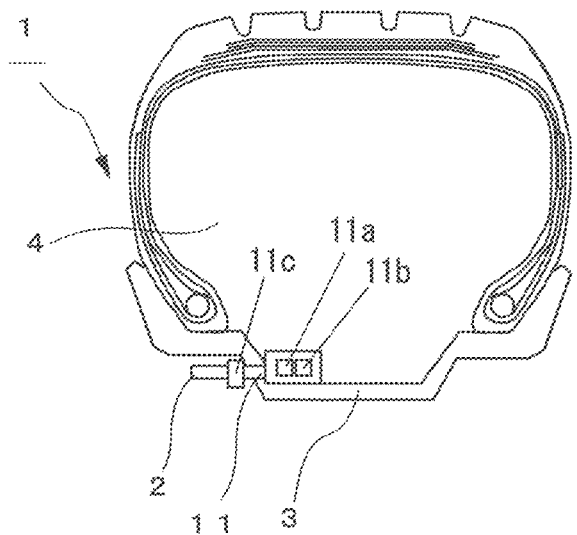
FIG. 2 is a diagram showing a mounting example of sensors.

As shown in FIG. 2, the sensor unit 11 has a pressure sensor 11a and a temperature sensor 11b, is integrally mounted with a tire valve 2 of an aircraft tire (hereinafter referred to as a tire 1) within a tire air chamber 4 of a wheel rim 3, and measures a temperature of gas within the tire 1. Reference numeral 11c denotes a transmitter for transmitting the measured gas temperature within the tire 1 to the tire information acquisition means 13.

The takeoff site information acquisition means 12 obtains data about the air temperature (outside air temperature) and altitude (atmospheric pressure) at a pre-takeoff airport from the takeoff airport. The outside air temperature may be a temperature obtained by an outside air temperature sensor 14a of the airframe information acquisition means 14.

The tire information acquisition means 13 obtains a temperature of the gas within the tire 1. Specifically, it stores the gas temperature within the tire 1 received from the transmitter 11c.

The airframe information acquisition means 14 comprises the outside air temperature sensor 14a and an altimeter 14b which are mounted on an unshown aircraft body and measures a temperature and atmospheric pressure around the aircraft.

The landing site information acquisition means 15 obtains data about the air temperature (outside air temperature) and altitude (atmospheric pressure) at a landing airport from the landing airport.

The pre-landing internal pressure setting means 16 calculates tire internal pressure IPA from the altitude and outside air temperature of the landing airport and the aircraft weight so that tire deflection on landing becomes predetermined deflection (35% for radial tire and 33% for bias tire). The weight of the aircraft is obtained by subtracting the weight corresponding to the fuel consumed in flight from a load acting on the tires 1 before takeoff.

The in-flight internal pressure calculation means 17 calculates the tire internal pressure IP at a flight altitude of the aircraft by the following calculation formulae (1) and (2) so that correction coefficient Y becomes a predetermined value. And, the IP is adjusted by the tire internal pressure adjusting means 18.

In the following calculation formulae, TA denotes a gas temperature inside the tires of the in-flight aircraft, and TI denotes a gas temperature (outside air temperature) predicted inside the tires on landing.

$$IP1=\{IP-(a_4 \cdot TI^4+a_3 \cdot TI^3+a_2 \cdot TI^2+a_1 \cdot TI+Y)\} \cdot (273+TA)/(273+TI)+a_4 \cdot TA^4+a_3 \cdot TA^3+a_2 \cdot TA^2+a_1 \cdot TA+Y \quad (1)$$

$$IP2=IPA+a_4 \cdot TA^4+a_3 \cdot TA^3+a_2 \cdot TA^2+a_1 \cdot TA+Y \quad (2)$$

where, $a_1=33 \times 10^{-4}$, $a_2=4 \times 10^{-5}$, $a_3=2 \times 10^{-6}$, $a_4=4 \times 10^{-8}$.

The correction coefficient Y is in a range of $-0.943773 < Y < 1.0563$.

When landing, the load acting on the tires becomes smaller than when taking off, so that the IP becomes lower than the internal pressure measured during flight. Therefore, the tire internal pressure adjusting means 18 bleeds air from the tires to adjust the tire internal pressure.

Figure 3:
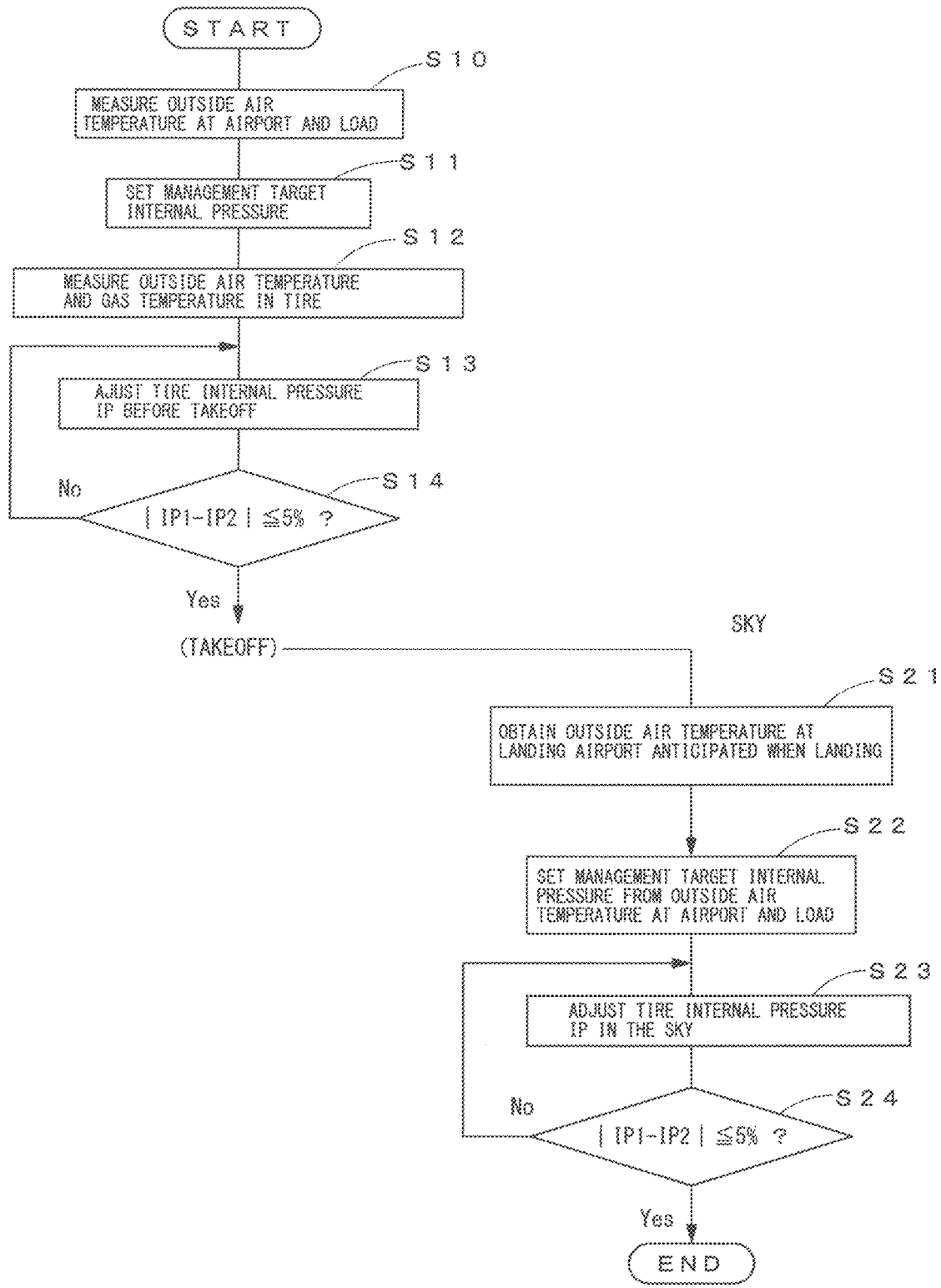
FIG. 3 is a flowchart showing an aircraft tire management method according to an embodiment of the invention.

Next, the aircraft tire management method according to the present invention is described with reference to the flowchart of FIG. 3.

The flowchart of this embodiment comprises tire internal pressure adjustment steps before takeoff (Steps S10 to S14) and tire internal pressure adjustment steps before landing (Steps S21 to S24).

The tire internal pressure IP before takeoff is set when for example, a tire is mounted before the aircraft takes off so that the tire deflection at takeoff becomes 35% for the radial tire and 33% for the bias tire.

The tire temperature before takeoff is the same as the outside air temperature at the airport when the aircraft is parked for a long time after landing, but when the aircraft is parked for a short time after landing, the tire temperature becomes higher than the outside air temperature because it is influenced by heat generation of the tire caused by landing and taxiing.

Therefore, in order to set the tire internal pressure before takeoff, the load acting on the tire is calculated from the number of passengers and loaded fuel or measured (Step S10), and a target internal pressure (hereinafter referred to as management target internal pressure IPA) at takeoff is set based on the load (Step S11).

Then, outside air temperature TA and tire inside gas temperature TI are measured (Step S12), and tire internal pressure IP is adjusted so that the correction coefficient Y becomes a predetermined value by using the following conversion formulae (1) and (2) (Step S13).

$$IP1=\{IP-(a_4 \cdot TI^4+a_3 \cdot TI^3+a_2 \cdot TI^2+a_1 \cdot TI+Y)\} \cdot (273+TA)/(273+TI)+a_4 \cdot TA^4+a_3 \cdot TA^3+a_2 \cdot TA^2+a_1 \cdot TA+Y \quad (1)$$

$$IP2=IPA+a_4 \cdot TA^4+a_3 \cdot TA^3+a_2 \cdot TA^2+a_1 \cdot TA+Y \quad (2)$$

where, $a_1=33 \times 10^{-4}$, $a_2=4 \times 10^{-5}$, $a_3=2 \times 10^{-6}$, $a_4=4 \times 10^{-8}$.

The correction coefficient Y is in a range of $-0.943773 < Y < 1.0563$.

The IP1 denotes a relative internal pressure when the outside air temperature is TA and the gas temperature inside the tire is TI, and the IP2 denotes a target value of the internal pressure when the outside air temperature is TA.

In Step S14, it is determined whether the difference between IP1 and IP2 is within 5 psi.

When the difference between IP1 and IP2 exceeds 5 psi, the tire internal pressure IP is adjusted so that the difference between IP1 and IP2 becomes within 5 psi, and the process returns to Step S13 to determine IP1 again.

When the difference between IP1 and IP2 is within 5 psi in Step S14, the IP adjusted in Step S13 becomes the tire internal pressure.

Thus, the tire deflection at takeoff can be set to 35% for the radial tire and 33% for the bias tire.

Next, the tire internal pressure adjustment step before landing will be described.

First, data about the outside air temperature at a landing airport predicted when landing is obtained (Step S21), and management target internal pressure IPA which is a target internal pressure on landing is set according to the outside air temperature and load (Step S22).

As the load acting on the tire, load W resulted from subtraction of the fuel consumed while flying from the load at the takeoff time may be used.

The management target internal pressure IPA is an internal pressure so that the tire deflection on landing becomes 35% for the radial tire and 33% for the bias tire.

Then, the tire internal pressure IP in the sky, that makes the landing tire internal pressure to be the management target internal pressure IPA, is determined by using the following conversion formulae (1) and (2) (Step S23).

In this case, TA indicates a gas temperature inside the tires on landing, and TI indicates a gas temperature inside the tires in the sky. The gas temperature inside the tires on landing is equal to the outside air temperature at a landing airport.

$$IP1=\{IP-(a_4 \cdot TI^4+a_3 \cdot TI^3+a_2 \cdot TI^2+a_1 \cdot TI+Y)\} \cdot (273+TA)/(273+TI)+a_4 \cdot TA^4+a_3 \cdot TA^3+a_2 \cdot TA^2+a_1 \cdot TA+Y \quad (1)$$

$$IP2=IPA+a_4 \cdot TA^4+a_3 \cdot TA^3+a_2 \cdot TA^2+a_1 \cdot TA+Y \quad (2)$$

where, $a_1=33\times10^{-4}$, $a_2=4\times10^{-5}$, $a_3=2\times10^{-6}$, $a_4=4\times10^{-8}$.

IP1 is a use time setting target internal pressure and calculated from the internal pressure IP measured with the management target internal pressure IPA used as an index, tire temperature TI in the sky, and tire temperature TA at landing.

IP2 is a temperature conversion setting target internal pressure and calculated from the management target internal pressure IPA and the landing tire temperature TA. For IP and IPA, it is also necessary to consider an altitude of each site. It is because when the altitude becomes higher, the tire internal pressure increases as the atmospheric pressure reduces.

In Step S24, it is determined whether the difference between IP1 and IP2 is within 5 psi.

When the difference between IP1 and IP2 exceeds 5 psi, the process returns to Step S23, and the tire internal pressure IP is adjusted.

EXAMPLES

In examples, tests were conducted with environments and working conditions at takeoff and landing airports replaced with indoor test conditions, and effects were verified.

The tire to be used in an example and Comparative Examples 1 and 2 is a main tire 46×17R20 30PR for A320 with a normal load of 46000 Lbs. and a normal internal pressure of 222 Psi.

And, verification is executed by an indoor experiment under conditions that an altitude is 82 m, an air temperature is 25° C., and an atmospheric pressure is 1003.78 hPa with a sea level pressure P0=1013.25 hPa (one atmospheric pressure) assumed as a standard.

A drum test machine 3 m in diameter was used for the effect verification test.

To make the drum surface look similar to the runway surface of the airport, sandpaper was affixed to the surface of the drum steel in order to accelerate abrasion of the tread.

A case in which an aircraft takeoff airport has a high altitude and a low temperature and an aircraft landing airport has a low altitude and a high temperature is described below. Tire working conditions at takeoff and airport environments are as follows.

Tire load: 41400 Lbs.
Tire inside gas temperature: −10° C.
Altitude of airport: 0 m, air temperature: −30° C.
(When taxiing to take off, the tire inside gas temperature is 20° C. higher than the outside air temperature at the airport.)
Tire working conditions at landing and airport environments are as follows.
Tire load: 32200 Lbs.
Tire inside gas temperature: 30° C.
Altitude of airport: 1000 m, air temperature: 30° C.

(After taking off, the tire inside gas is cooled down, and when landing, it has the same state as the outside air temperature at the landing airport.)

Comparative Example 1

In Comparative Example 1, the tire internal pressure of an actual aircraft was not corrected depending on the air temperatures and altitudes at the takeoff and landing airports and the tire inside gas temperature, and the tire internal pressure was set so that the tire deflection became 35% when taking off.

Therefore, when the tire load at takeoff was 41400 Lbs., the internal pressure was set to 200 psi.

It was assumed that the tire inside gas temperature was the same as the outside air temperature at the airport when the tire was mounted, and the tire inside gas temperature was 20° C. higher than the air temperature when taking off. Then, it was determined that TI=−10° C. and TA=−30° C., and the internal pressure IP was determined by using the following conversion formulae (1) and (2) so that the correction coefficient became Y=0.0563.

$$IP1=\{IP-(a_4 \cdot TI^4+a_3 \cdot TI^3+a_2 \cdot TI^2+a_1 \cdot TI+Y)\} \cdot (273+TA)/(273+TI)+a_4 \cdot TA^4+a_3 \cdot TA^3+a_2 \cdot TA^2+a_1 \cdot TA+Y \quad (1)$$

$$IP2=IPA+a_4 \cdot TA^4+a_3 \cdot TA^3+a_2 \cdot TA^2+a_1 \cdot TA+Y \quad (2)$$

where, $a_1=33\times10^{-4}$, $a_2=4\times10^{-5}$, $a_3=2\times10^{-6}$, $a_4=4\times10^{-8}$.

Results are IP=184 psi, IP1=184.74 psi, IP2=184.03 psi, and the difference between IP1 and IP2 is within ±5 psi, so that the internal pressure becomes 184 psi.

In the indoor takeoff test, the internal pressure was 184 psi, the tire load was 46000 Lbs., and taxiing was conducted at a speed of 40 km/h for ten minutes. After stopping, the speed was increased proportionally in 50 seconds to accelerate up to 225 km/h before taking off. And this process was determined as one takeoff test.

Next, the internal pressure on landing was determined.

When landing, the tire inside gas temperature was 30° C. same to the outside air temperature at the airport. When taking off, however, the tire inside gas temperature was higher than the outside air temperature at the airport, that was TA=−10° C. Therefore, with TI=30° C. and TA=−10° C., the above conversion formulae (1) and (2) were used to determine the internal pressure IP so that the correction coefficient became Y=0.0563.

Results are IP=231 psi, IP1=200.29 psi, IP2=200.28 psi, and the difference between IP1 and IP2 was within ±5 psi, so that the internal pressure became 231 psi.

That is, when correction was not conducted according to the air temperature, altitude and tire inside gas temperature at the landing airport, the tire internal pressure was changed from 184 psi to 231 psi due to an influence of only a gas temperature change in the tire (−10° C.→30° C.).

In addition, when the altitude difference (1000 m) between the takeoff and landing airports was taken into consideration, the tire internal pressure was increased by 1.5 psi and finally became 232.5 psi.

Therefore, the landing test was conducted with the internal pressure of 232.5 psi and a tire load of 32200 Lbs.

Tire deflection was 23.4% under the above conditions.

After the takeoff test, the tire was cooled down indoors, and the landing test was conducted.

The landing speed was 180 km/h and decelerated down to 40 km/h in 30 seconds. Then, taxiing was continuously conducted at the speed of 40 km/h for 10 minutes before stopping. This process was determined as one landing test.

After the landing test was completed, the tire was cooled down indoors, and the takeoff test was conducted again.

Then, the takeoff and landing tests were alternately repeated under the above conditions.

When the takeoff and landing tests were respectively conducted 500 times, tire treads were worn, and the center groove disappeared.

In addition, the retreading, takeoff test, and landing test of the tire were respectively repeated two times to conduct a total of 1500 times of tests. But, no abnormalities such as separation were found on the tire.

Thus, it was found in Comparative Example 1 that the tire internal pressure on landing depended on the tire internal pressure at taking off, and the tire deflection on landing decreased to 23.4%. As a result, working conditions were not appropriate for exhibiting the target wear.

That is, when landing, a large amount of tread rubber was scraped off by the runway surface at a moment when the tires touched down to the runway but when the tire deflection was small, the tire's ground contact area was also reduced, and the amount of tire wear increased.

Comparative Example 2

The working conditions at takeoff in Comparative Example 2 were set to be the same as in Comparative Example 1 to have an internal pressure of 200 psi, a tire load of 41400 Lbs., and an appropriate tire deflection of 35%.

On the other hand, the working conditions at landing were set so that the tire deflection became the appropriate value of 35% in order to decrease the tire wear.

To provide the tire deflection of 35%, it is necessary to make the landing internal pressure to be IPA=155 psi.

With the tire inside gas temperature TI=30° C. and the outside air temperature at the airport TA=−10° C., the internal pressure IP that the correction coefficient became Y=0.0563 was determined by using the following formulae (1) and (2).

$$IP1=\{IP-(a_4 \cdot TI^4+a_3 \cdot TI^3+a_2 \cdot TI^2+a_1 \cdot TI+Y)\} \cdot (273+TA)/(273+TI)+a_4 \cdot TA^4+a_3 \cdot TA^3+a_2 \cdot TA^2+a_1 \cdot TA+Y \quad (1)$$

$$IP2=IPA+a_4 \cdot TA^4+a_3 \cdot TA^3+a_2 \cdot TA^2+a_1 \cdot TA+Y \quad (2)$$

where, $a_1=33\times10^{-4}$, $a_2=4\times10^{-5}$, $a_3=2\times10^{-6}$, $a_4=4\times10^{-8}$.

Results are IP=179 psi, IP1=155.15 psi, IP2=155.28 psi, and the difference between IP1 and IP2 is within ±5 psi, so that the internal pressure becomes IP=179 psi.

Here, even when an internal pressure drop of 1.5 psi due to an altitude difference (1000 m) between takeoff and landing airports is taken into consideration, the internal pressure at takeoff becomes 177.5 psi.

When the internal pressure at takeoff is 177.5 psi and the tire load is 41400 Lbs., the tire deflection on landing becomes 39%.

Similar to Comparative Example 1, the takeoff test and the landing test were repeated. When they were respectively repeated 500 times, a separation was caused in a bead portion, and the tests were terminated.

The center groove of the tire was worn by about 70% only.

Thus, when the tire internal pressure IP at takeoff was reduced so that the tire deflection on landing had an appropriate value of 35%, it was found that the tire wear was improved but the durability of the tire was lowered.

Example

In Comparative Example 2, the tire internal pressure at takeoff was reduced in order to improve the abrasion resistance, but in the example according to the present invention, the working conditions at takeoff were set to be the same as in Comparative Example 1 as described below, and the tire internal pressure on landing was adjusted to an appropriate internal pressure to improve the tire wear without deteriorating the durability of the tire.

In an indoor takeoff test, it was determined that the internal pressure was 184 psi, the tire load was 4600 Lbs., taxiing was conducted at a speed of 40 km/h for 10 minutes, and the speed was proportionally increased in 50 seconds to accelerate up to 225 km/h before taking off. This process was determined as one takeoff test.

To obtain an appropriate tire deflection (35%) on landing, it is necessary to set the internal pressure on landing to IPA=155 psi. Its procedure is shown below.

First, the internal pressure at an altitude of 10000 m before landing is determined.

At the altitude of 10000 m in the sky, both of the outside air temperature and the tire inside gas temperature are −40° C. Therefore, when an aircraft is to take off and the tire is set to have a tire inside gas temperature TI=−10° C. and an internal pressure of 200 psi at an altitude of 0 m, the tire internal pressure becomes IP=177 psi under the conditions of the altitude 10000 m and the outside air temperature TA=−40° C. IP is determined with TI=−40° C. and TA=−10° C. by using the following conversion formulae (1) and (2) so that the correction coefficient becomes Y=0.0563.

$$IP1=\{IP-(a_4 \cdot TI^4+a_3 \cdot TI^3+a_2 \cdot TI^2+a_1 \cdot TI+Y)\} \cdot (273+TA)/(273+TI)+a_4 \cdot TA^4+a_3 \cdot TA^3+a_2 \cdot TA^2+a_1 \cdot TA+Y \quad (1)$$

$$IP2=IPA+a_4 \cdot TA^4+a_3 \cdot TA^3+a_2 \cdot TA^2+a_1 \cdot TA+Y \quad (2)$$

where, $a_1=33\times10^{-4}$, $a_2=4\times10^{-5}$, $a_3=2\times10^{-6}$, $a_4=4\times10^{-8}$.

Results are IP1=199.86 psi, IP2=199.96 psi, and the difference between IP1 and IP2 is within ±5 psi, so that the internal pressure becomes 177 psi.

When an increase of 14.5 psi due to an altitude difference from the takeoff airport is considered, the internal pressure at the altitude of 10000 m becomes 191.5 psi.

Therefore, when the landing airport has the altitude of 1000 m and the air temperature of 30° C. (tire inside gas temperature is also 30° C.), to make the internal pressure on landing to the internal pressure of 155 psi to make the tire deflection on landing to the appropriate value 35%, it is necessary to adjust (pressure reduction) the tire internal pressure so as to reduce the internal pressure under the conditions of the altitude of 10000 m and the outside air temperature TA=−40° C.

The internal pressure IP under the conditions of the altitude 10000 m and the outside air temperature TA=−40° C. to have the internal pressure of 155 psi on landing is determined to have the correction coefficient Y=0.0563 by using the following conversion formulae (1) and (2) with the tire inside gas temperature TI=−40° C. in the sky and the tire inside gas temperature TA=30° C. at the landing airport.

$$IP1=\{IP-(a_4 \cdot TI^4+a_3 \cdot TI^3+a_2 \cdot TI^2+a_1 \cdot TI+Y)\} \cdot (273+TA)/(273+TI)+a_4 \cdot TA^4+a_3 \cdot TA^3+a_2 \cdot TA^2+a_1 \cdot TA+Y \quad (1)$$

$$IP2=IPA+a_4 \cdot TA^4+a_3 \cdot TA^3+a_2 \cdot TA^2+a_1 \cdot TA+Y \quad (2)$$

where, $a_1=33\times10^{-4}$, $a_2=4\times10^{-5}$, $a_3=2\times10^{-6}$, $a_4=4\times10^{-8}$.

Results are IP=119 psi, IP1=155.08 psi, IP2=154.96 psi, and the difference between IP1 and IP2 is within ±5 psi, so that the internal pressure becomes 119 psi.

When an increase of 13.1 psi due to the altitude difference (9000 m) from the landing airport is considered, the internal pressure at the altitude of 10000 m becomes 132 psi.

Therefore, when the internal pressure of 191.5 psi in the took-off state is reduced to 132 psi by partly removing air from the tire at the altitude of 10000 m in the sky, landing can be made with an appropriate internal pressure of 155 psi (tire deflection of 35%) under the working conditions at the landing airport.

In the indoor test, the landing test was conducted with an internal pressure of 155 psi and a tire load of 32200 Lbs.

Since the takeoff test was the same as in Comparative Example 1, its description was omitted.

After the takeoff test, the tire was cooled down indoors, and then the landing test was conducted.

The landing speed was 180 km/h and decelerated down to 40 km/h in 30 seconds. Then, taxiing was continuously conducted at a speed of 40 km/h for 10 minutes before stopping. This process was determined as one landing test.

After the landing test was completed, the tire was cooled down indoors, and the takeoff test was conducted again.

Then, the takeoff and landing tests were alternately repeated under the above conditions.

When the takeoff and landing tests were respectively conducted 700 times, the tire treads were worn out and the center groove disappeared.

In addition, the retreading, takeoff test, and landing test of the tire were respectively repeated two times to conduct a total of 2100 times of tests. But, no abnormalities such as separation were found on the tire.

Thus, when the internal pressure was reduced by partly removing air from the tire at the altitude of 10000 m in the sky, it was confirmed that landing can be made with an appropriate internal pressure of 155 psi (tire deflection 35%) under the working conditions at the landing airport, and the abrasion resistance of the tire can be improved without deteriorating durability.

Although the present invention has been described with reference to the embodiment and examples, the technical scope of the present invention is not limited to the scope described in the above embodiment. It is apparent to those skilled in the art that various modifications or improvements can be added to the above embodiment. It is apparent from the claims that embodiments with such modifications or improvements also belong to the technical scope of the present invention.

For example, it was described in the above example that when the altitude and air temperature at the aircraft takeoff airport were low while the altitude and air temperature at the landing airport were high, namely when the tire pressure was not adjusted, landing was made with the tire internal pressure higher than the internal pressure set before the aircraft took off. But, it is needless to say that the present invention can be also applied to cases that the altitude and air temperature at the takeoff airport are high while the altitude and air temperature at the landing airport are low and that the altitudes and air temperatures at the takeoff and landing airports are almost the same.

Specifically, when the altitude and air temperature at the takeoff airport are high while the altitude and air temperature at the landing airport are low, the aircraft lands with the tire internal pressure lower than the internal pressure set before the aircraft takes off, but the consumed fuel makes the landing aircraft lighten in weight, and the load acting on the tires is reduced as a result. Therefore, the tire deflection is normally smaller than an appropriate value 35%. Therefore, it is desirable to further reduce the internal pressure by partly removing air from the tires in the sky in the same manner as in the above-described embodiment.

Necessity of charging gas into the tires in the sky is limited to, for example, a case that the consumed fuel is small because of emergency landing made in a short time after takeoff.

And, an absolute target internal pressure (management target internal pressure IPA) was fixed in the above-described embodiment, but the IPA may be different depending on a target performance even in the same environment and the same working conditions. And, even when the target performance is the same, the IPA is different depending on the tire size, specifications, tire used environment and working conditions.

DESCRIPTION OF REFERENCE NUMERALS 1 aircraft tire
2 tire valve
3 wheel rim
4 tire air chamber
10 aircraft tire management device
11 sensor unit
11$a$ pressure sensor
11$b$ temperature sensor
11$c$ transmitter
12 takeoff site information acquisition means
13 tire information acquisition means
14 airframe information acquisition means
14$a$ outside air temperature sensor
14$b$ altimeter
15 landing site information acquisition means
16 pre-landing internal pressure setting means
17 in-flight internal pressure setting means
18 tire internal pressure adjusting means

The invention claimed is:
1. An aircraft tire management method, comprising the steps of:
   obtaining the internal pressure and temperature of tires housed inside an aircraft in flight;
   obtaining the temperature and atmospheric pressure around the aircraft;
   obtaining the altitudes and air temperatures at the takeoff and landing sites for the aircraft;
   calculating a target internal pressure at takeoff from information about the altitude and air temperature at a takeoff airport;
   calculating a tire internal pressure of the in-flight aircraft whereby the tire internal pressure becomes a target tire internal pressure on landing from information about the temperature and atmospheric pressure around the tires of the aircraft, the air temperature and atmospheric pressure at the landing airport, and a load anticipated to act on the tires on landing; and
   adjusting the tire internal pressure of the in-flight aircraft so that the obtained internal pressures of the tires housed inside the aircraft become the calculated tire internal pressure of the in-flight aircraft.

\* \* \* \* \*